Figure 1:
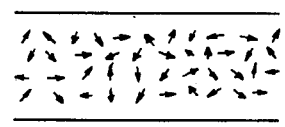

United States Patent [19]

Byatt

[11] 4,059,827
[45] Nov. 22, 1977

[54] MOLECULAR INFORMATION STORAGE SYSTEMS

[75] Inventor: Dennis William George Byatt, Chelmsford, England

[73] Assignee: The Marconi Company Limited, England

[21] Appl. No.: 659,560

[22] Filed: Feb. 19, 1976

[30] Foreign Application Priority Data

Mar. 13, 1975 United Kingdom ............... 10493/75

[51] Int. Cl.² ............................................ G11C 11/46
[52] U.S. Cl. ................................. 365/126; 346/151; 358/129
[58] Field of Search ................. 340/173 TP; 358/129; 346/151

[56] References Cited

U.S. PATENT DOCUMENTS

| | | | |
|---|---|---|---|
| 3,171,106 | 2/1965 | Lemmond | 340/173 TP |
| 3,450,831 | 6/1969 | Gaynor | 358/129 |
| 3,485,621 | 12/1969 | Kazan | 340/173 TP |
| 3,485,623 | 12/1969 | Wilferet | 340/173 TP |
| 3,513,449 | 5/1970 | Young | 340/173 TP |
| 3,655,371 | 4/1972 | Chafaris | 340/173 TP |

*Primary Examiner*—Terrell W. Fears
*Attorney, Agent, or Firm*—Diller, Brown, Ramik & Wight

[57] ABSTRACT

A thermoplastic film is used to record data in the form of variations in molecular orientation of the polar molecules. The film is softened by heating and the data recorded, after which the film is cooled to retain the recorded molecular orientation.

10 Claims, 4 Drawing Figures

MOLECULAR INFORMATION STORAGE SYSTEMS

The present invention relates to a system for recording and reproducing data on films of plastics material.

It is already known to record data on thermoplastic films by applying a field to the plastics film so as to deposit a charge. The charge is often deposited by means of an electron beam scanning system. After the charge has been deposited on the film, the latter is heated to its softening point whereupon electrical attraction between the charges on its surfaces results in a deformation of the film. The deformations correspond to the changes in the electric field applied during recording and can be read either electrically or optically.

In such a system because the data is stored as deformations in the film there is a limit to the resolution of the recording medium which, in turn, limits the density with which data can be packed into a given area of the film.

The present invention seeks to provide an improved system for recording on thermoplastic material.

According to one aspect of the invention there is provided a method of data storage and recovery in which the data is stored as variations in molecular orientation within a thermoplastic film having polar molecules.

According to a second aspect of the present invention, there is provided a method of recording data on thermoplastic film in which an electric field modulated in accordance with data to be stored is applied across a thermally softened thermoplastic material moving relative to the electric field and having polar molecules, such as to re-orient the said molecules and, subsequently, the thermoplastic material is cooled so that the molecules remain with substantially the same orientation as adopted in the electric field.

It is known that certain thermoplastic materials, such as polyvinylidene fluoride ($PVF_2$) have polar molecules that is to say, molecules which have a net dipole moment. If such a material is heated to its softening point and a strong electric field is applied, the molecules may slip past each other and re-orient themselves with their dipole moments in line with the electric field. If now the material is cooled, then even upon removal of the elctric field the molecules remain in their new orientations thus creating a potential difference between the faces of the thermoplastic film. The recording method proposed by the invention thus enables data to be stored on a thermoplastic film as a variation in molecular orientation rather than as physical deformations of the surface thereby enabling a higher density of packing.

In one embodiment of the invention, apparatus for recording data on thermoplastic film having polar molecules comprises means for generating an electron beam, means for modulating the elctron beam in accordance with the data to be stored, means for transporting the thermoplastic film past the modulated electron beam, means for heating the thermoplastic film prior to exposure to the electron beam and means for cooling the thermoplastic film after exposure to the electron beam.

As an alternative to using electron beams as a means for applying an electrical potential to the thermoplastic film one may use a pair of electrodes placed in physical contact with the film.

The reading of the stored data may also be effected either by means of an electron beam or by means of a pair of electrodes in contact with thermoplastic film, though an electron beam is preferred as it provides the better resolution.

A preferred embodiment of apparatus for reading data stored on a thermoplastic film having polar molecules comprises means for generating an electron beam, means for transporting the data carrying thermoplastic film past the electron beam, a first electrode arranged adjacent the thermoplastic film and arranged to reflect electrons from the primary electron beam onto a second collector electrode, the current through which is dependent upon the stored data. By suitably adjusting the potentials on the first electrode and the collector electrodes, the quantity of electrons collected is related to the molecular orientation of the thermoplastic film at the point of contact with the electron beam.

Preferably the thermoplastic film is in the form of a tape wound over two spools and transported past the electron beam.

Preferably also the electron beam is scanned transversely of the length of the tape whilst the tape is progressing parallel to its length.

Figure 2:
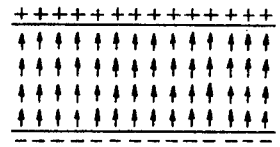
Figure 3:
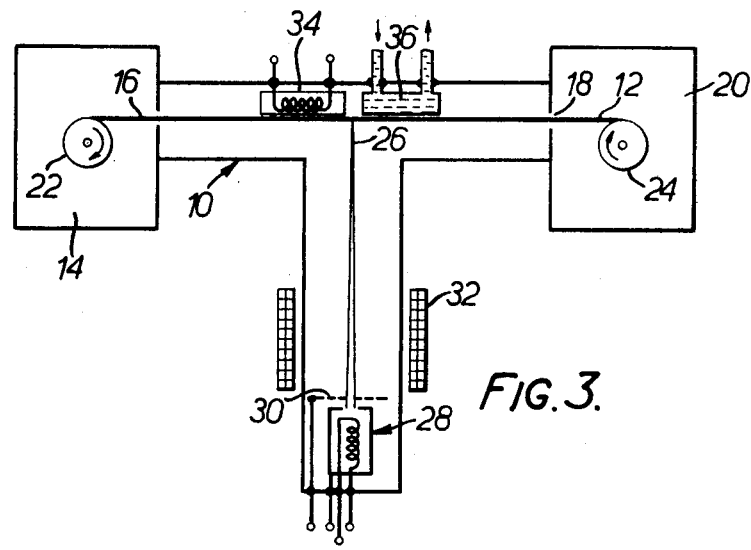
Figure 4:
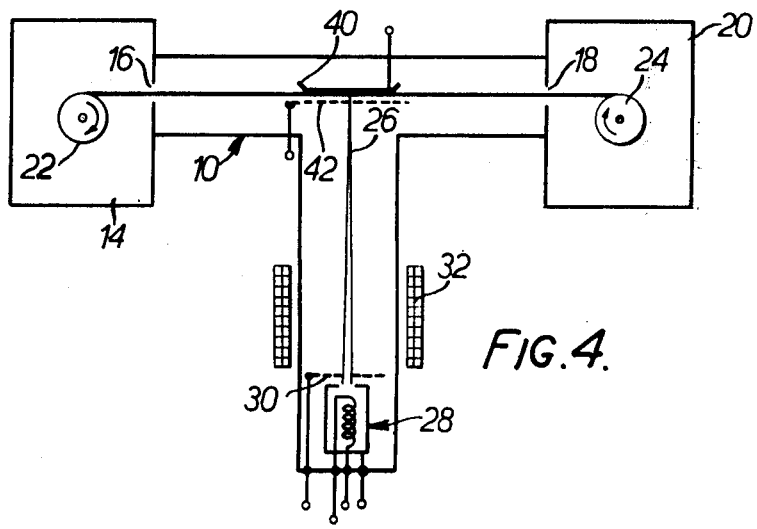

The invention will now be described further, by way of example, with reference to the accompanying drawings in which:

FIG. 1 is a sketch which shows the orientation of molecule dipoles in a thermplastic film before recording, FIG. 2 is a sketch similar to FIG. 1 but showing the alignment of the dipoles after recording has taken place, FIG. 3 is a schematic representation of a device for recording data on the thermoplastic tape, and FIG. 4 is a schematic diagram of apparatus for reproducing data from thermoplastic tape.

In FIG. 1 there is shown a schematic representation of the orientation of the dipole moments of molecules in a thermoplastic film prior to recording. The dipoles are represented by little arrows, the head of each arrow being at the positive end of the dipole. A typical plastics material having polar molecules is polyvinylidene in which the molecule possess hydrogen and fluorine bonds normal to the axis of the molecule. The hydrogen atom is positive whereas the fluorine atom is negative and whilst the total charge in the molecule is zero, because of the spacing between the hydrogen and fluorine atoms the molecule exhibits a net dipole moment. As shown in FIG. 1 the dipoles are normally randomly oriented and there is therefore no evidence of any charge on the surface of the film.

If such a thermoplastic material is heated to its softening point and exposed to a strong electric field, the molecules rotate and orientate themselves with respect to the applied field. This position of the molecules is shown in FIG. 2. If the film is now allowed to cool the molecules will remain with this orientation and a net potential difference exists between the opposite faces of the film. This potential difference may be measured by means of any amplifier having a very large input impedance. The need for the large input impedance stems from the fact that the internal resistance of the plastics film is very high.

In FIG. 3 there is shown a schematic representation of apparatus for recording on thermoplastic tape using an electron beam. The apparatus includes a generally T shaped evacuated envelope 10 which during operation is connected to a vacuum pump (which is not shown in the drawing). The thermoplastic tape 12 traverses the cross-piece of the T shaped envelope 10 entering it from a separate chamber 14 through a small aperture 16 and leaving it through a small aperture 18 which leads onto a second chamber 20. The chambers 14 and 20 are both evacuated but to a lesser extent than the space within the envelope 10. The tape 12 is arranged on spools 22 and 24, within the chambers 14 and 20 and is driven by means of an electric motor arranged within one of these chambers.

The other branch of the T shaped envelope 10 includes the means necessary for producing and deflecting an electron beam 26. The beam 26 is generated by means of an electron gun generally designated 28, is modulated by means of a grid 30 and is subsequently focused and deflected by means of coils 32.

Before passing the electron beam 26 the thermoplastic film 12 passes near a heating element 34 and after passing the electron beam the film is cooled by means of a cooling element 36 in the form of a heat exchanger carrying a coolant fluid which is introduced through pipes sealed into the envelope 10.

In operation, the film is wound one of the spools 22 and fed through the cross-piece of the T shaped envelope 10 to the take-up spool 24. This may be affected by means of conventional feed mechanism. The chambers 14 and 20 are evacuated and subsequently the envelope 10 is connected to a vacuum pump. There remains during operation a pressure difference between the chambers 14, 20 and the envelope 10 but because of the small size of the aperture interconnecting the envelope in these chambers any leakage of gas into the T shaped envelope 10 can be compensated for by the vacuum pump.

The motors are then turned on and as the film is driven through the evacuated chamber within the envelope 10 it is first heated by the heating element 34. This heating is sufficient to soften the thermoplastic material of the tape 12 so that the electron beam 26 has the effect of aligning the molecules to an extent determined by the intensity of the beam. After exposure to the beam 26 the tape is cooled by the cooling element and wound onto the take-up reel 24. The tape now possesses a stored charge determined by the potential applied to the grid 30 during traverse of the tape.

During movement of the tape the electron beam is also made to move in and out of the plane of the paper in FIG. 3 by means of scanning coils 32. This enables the full area of the tape to be used and not merely a line as wide as the electron beam.

FIG. 4 shows a generally similar apparatus for reproducing the information stored on thermoplastic film by the apparatus in FIG. 3. The apparatus has several elements in common with the recording apparatus in FIG. 3 and to avoid repetition of description analogous parts have been re-allocated the same reference numerals. In place of the cooling and heating element 36 and 34, the reproducing apparatus includes a base electrode 40 and a collector electrode 42. The same procedure is used to insert a tape in the apparatus to evacuate the chambers 14 and 20 and the envelope 10 and to scan and focus the electron beam. On this occasion, however, a steady voltage is applied to the grid 30 a negative potential is applied to the base electrode 40 and a slightly positive charge is applied to the collector electrode 42. The reading of the charge on the tape 12 is somewhat analogous to the method of reading the information stored on the target of an image orthican.

The electron beam is scanned across the charge pattern stored in the thermoplastic tape. The negative potential on the base electrode 40 just reflects the primary beam onto the collector electrode 42. By suitably adjusting the potentials on the base plate and collector in relation to the cathode potential of the electron gun, the quantity of electrons collected is related to the charge pattern upon the tape at the deflected position of the beam. The signal picked up from the collector grid 42 may therefore be amplified to recover the original recorded information.

In common with the known techniques for recording on thermoplastic material, the present invention provides a reusable tape since once the recordings are no longer required they may be erased by heating the film above its softening point in the absence of an applied field. The dipoles will then re-orient themselves randomly as a result of their thermal energy and thereby return the film to its original state.

I claim:

1. A method of data storage and recovery in which the data is stored as variations in molecular orientation within a thermoplastic film having polar molecules, said film consisting of polyvinylidene fluorine.

2. A method of recording data on a thermoplastic film consisting of polyvinylidene flouride having a random orientation of its polar molecules in which an electric field modulated in accordance with data to be stored is applied across said film while the film is thermally softened and is moving relative to the electric field, such as to re-orient the said molecules and thereby produce potential differences between the surfaces of the film and, subsequently, the thermoplastic material is cooled so that the molecules remain with substantially the same orientation as adopted in the electric field.

3. Apparatus for recording data on thermoplastic film consisting of polyvinylidene flouride having a random orientation of its polar molecules including generating means for generating an electric potential which is modulated in accordance with the data to be stored, means for transporting the thermoplastic film relative to the generating means so as to record the data thereon, means for heating the thermoplastic film prior to recording whereby said polar molecules are reoriented by said generating means to record the data as potential differences across the surface of said film; and means for cooling the thermoplastic film after recording has taken place to retain said potential differences.

4. Apparatus as claimed in claim 3 wherein the generating means is an electron beam.

5. Apparatus as claimed in claim 3 wherein the generating means comprises a pair of electrodes in physical contact with the film.

6. Apparatus for reading data stored on a thermoplastic film consisting of polyvinylidene fluoride having preferential orientations of its polar molecules such as to produce potential differences between the surfaces of the film which constitute the data to be read, comprising means for generating an electron beam, means for transporting the data carrying thermoplastic film past the electron beam, a first electrode arranged adjacent the thermoplastic film and arranged to reflect electrons from the primary electron beam onto a second collector electrode, the current through which is dependent upon the stored data.

7. Apparatus as claimed in claim 4 wherein the thermoplastic film is in the form of a tape wound over two spools and transported past the electron beam.

8. Apparatus as claimed in claim 7 wherein the electron beam is scanned transversely of the length of the tape whilst the tape is progressing parallel to its length.

9. The method of data storage which comprises the steps of:
   a. heating a film which consists of a substantially homogeneous thermoplastic material such as polyvinylidene fluoride having a random orientation of polar molecules, until such material softens;
   b. subjecting selected regions of said film to an electric field of strength sufficient to reorient the polar molecules of said material, in said selected regions thereof, and thereby produce a potential difference between the faces of said film; and
   c. cooling said film to retain said potential difference effected by said reorientation of said polar molecules.

10. The method according to claim 9 wherein said film consists of polyvinylidene flouride.

* * * * *